United States Patent
Zhang et al.

(10) Patent No.: US 11,892,922 B2
(45) Date of Patent: Feb. 6, 2024

(54) STATE MANAGEMENT METHODS, METHODS FOR SWITCHING BETWEEN MASTER APPLICATION SERVER AND BACKUP APPLICATION SERVER, AND ELECTRONIC DEVICES

(71) Applicant: HANGZHOU HIKVISION DIGITAL TECHNOLOGY CO., LTD., Zhejiang (CN)

(72) Inventors: Zhixin Zhang, Zhejiang (CN); Jun Li, Zhejiang (CN); Zhixiao Li, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/789,780

(22) PCT Filed: Dec. 30, 2020

(86) PCT No.: PCT/CN2020/141595
§ 371 (c)(1),
(2) Date: Jun. 28, 2022

(87) PCT Pub. No.: WO2021/136422
PCT Pub. Date: Jul. 8, 2021

(65) Prior Publication Data
US 2023/0041089 A1     Feb. 9, 2023

(30) Foreign Application Priority Data
Dec. 31, 2019   (CN) .......................... 201911413803.9

(51) Int. Cl.
*G06F 11/00* (2006.01)
*G06F 11/20* (2006.01)

(52) U.S. Cl.
CPC ...... *G06F 11/2038* (2013.01); *G06F 11/2025* (2013.01)

(58) Field of Classification Search
CPC .......................... G06F 11/2025; G06F 11/2038
See application file for complete search history.

(56) References Cited

U.S. PATENT DOCUMENTS

2005/0289391 A1    12/2005   Ichikawa et al.
2015/0212909 A1*   7/2015    Sporel .................. G06F 11/2025
                                                                 714/4.11

FOREIGN PATENT DOCUMENTS

CN    101060391 A    10/2007
CN    102480367 A    5/2012
(Continued)

OTHER PUBLICATIONS

International Search Report Issued in PCT Application No. PCT/CN2020/141595, dated Mar. 31, 2021 with translation provided by WIPO.

(Continued)

Primary Examiner — Michael Maskulinski
(74) Attorney, Agent, or Firm — Ladas & Parry, LLP

(57) ABSTRACT

The present disclosure provides a state management method, a method for switching between a master application server and a backup application server, and an electronic device. In present disclosure, the management server updates the recorded backup application server state in time by querying for the connection state of the hot-backup connection between the master application server and the backup application server, and when the master application server is in failure, instead of immediately controlling the master application server and the backup application server to perform switching between the master and backup application servers, the management server controls the master application server and the backup application server to perform master- (Continued)

backup switching between the application servers according to the recorded backup application server state.

18 Claims, 5 Drawing Sheets

(56) References Cited

FOREIGN PATENT DOCUMENTS

| | | |
|---|---|---|
| CN | 102571398 A | 7/2012 |
| CN | 202870563 U | 4/2013 |
| CN | 103455005 A | 12/2013 |
| CN | 103795553 A | 5/2014 |
| CN | 104993571 A | 10/2015 |
| CN | 105279044 A | 1/2016 |
| CN | 109101371 A | 12/2018 |
| CN | 111427728 A | 7/2020 |
| EP | 1 528 735 A2 | 5/2005 |

OTHER PUBLICATIONS

Written Opinion for PCT Application No. PCT/CN2020/141595, dated Mar. 31, 2021 and its English translation provided by Google Translate.

State Intellectual Property Office of the People's Republic of China, 1st Office Action and Search Report Issued in Application No. 2019114138039, dated Feb. 3, 2021, 22 pages. (Submitted with Machine/Partial Translation).

State Intellectual Property Office of the People's Republic of China, 2nd Office Action and Search Report Issued in Application No. 2019114138039, dated Feb. 3, 2021, 10 pages. (Submitted with Machine/Partial Translation).

State Intellectual Property Office of the People's Republic of China, 2nd Office Action Issued in Application No. 2019114138039, dated Jul. 6, 2021, 25 pages. (Submitted with Machine/Partial Translation).

* cited by examiner

STATE MANAGEMENT METHODS, METHODS FOR SWITCHING BETWEEN MASTER APPLICATION SERVER AND BACKUP APPLICATION SERVER, AND ELECTRONIC DEVICES

CROSS REFERENCE TO RELATED APPLICATIONS

This application is the national phase of International Application No. PCT/CN2020/141595 filed on Dec. 30, 2020, which claims priority to Chinese Patent Application No. 201911413803.9 filed on Dec. 31, 2019 in China, the disclosures of which are hereby incorporated by reference in their entireties.

TECHNICAL FIELD

The present disclosure relates to computer technology, in particular to a state management method, a method for switching between a master application server and a backup application server, and an electronic device.

BACKGROUND

In an application scenario where a single server is deployed, a defect of insufficient server business processing performance often occurs. In view of this defect, an application service function and a storage function on the server are often offloaded from the server, and the server is mainly responsible for business other than application services and data storage (such as user equipment access and management, system configuration, web services and other basic business). In this case, the server can be called a management server. The offloaded application service function and storage function run on another server (referred to as an application server), and the application server is responsible for application services and data storage. The business processing performance can be greatly improved through the cooperation of the management server and the application server.

To ensure high availability of application services and data storage, two above-mentioned application servers are often deployed, one of which is used as a master application server and the other is used as a backup application server. A hot-backup connection exists between the master application server and the backup application server. The master application server will back up locally newly added business data to the backup application server through the hot-backup connection when the master application server works normally. Once the master application server fails, a device role of the failed master application server is switched to a backup application server through master-backup switching, and a device role of the original backup application server is switched to a new master application server to continue to provide application services, which can ensure that application services are uninterrupted.

SUMMARY

The present disclosure provides a state management method, a method for switching between a master application server and a backup application server, and an electronic device.

In a first aspect, the embodiments of the present disclosure provide a state management method.

A state management method is applied to a management server, and the method includes: querying for a connection state of a hot-backup connection between a master application server and a backup application server; and when a backup application server state indicated by the connection state is inconsistent with a backup application server state recorded by the management server, updating the recorded backup application server state to the backup application server state indicated by the connection state.

As an embodiment, querying for the connection state of the hot-backup connection between the master application server and the backup application server includes: sending a query request message to the master application server, where the query request message is used to query for the connection state of the hot-backup connection; and obtaining the connection state of the hot-backup connection carried by a received query response message from the query response message.

As an embodiment, the backup application server state indicated by the connection state is inconsistent with the recorded backup application server state includes: when the backup application server state indicated by the connection state is a backup active state, if the recorded backup application server state is a backup ready state, it is determined that the backup application server state indicated by the connection state is inconsistent with the recorded backup application server state; where the backup active state is used to indicate that a backup application server works normally, and when the hot-backup connection is normal, the connection state of the hot-backup connection indicates that the backup application server state is the backup active state; the backup ready state is used to indicate that the hot-backup connection between a backup application server and a master application server is abnormal when the backup application server is not in failure.

As an embodiment, the backup application server state indicated by the connection state is inconsistent with the recorded backup application server state includes: when the backup application server state indicated by the connection state is a backup ready state, if the recorded backup application server state is a backup active state, it is determined that the backup application server state indicated by the connection state is inconsistent with the recorded backup application server state; where the backup ready state is used to indicate that the hot-backup connection between a backup application server and a master application server is abnormal when the backup application server is not in failure, and when the backup application server is not in failure, if the hot-backup connection is abnormal, the connection state of the hot-backup connection indicates the backup application server state is the backup ready state; the backup active state is used to indicate that a backup application server works normally.

As an embodiment, the method further includes: when it is detected that the backup application server is in failure, if the recorded backup application server state is a backup active state or a backup ready state, updating the recorded backup application server state to a backup failure state; where the backup active state is used to indicate that a backup application server works normally, the backup ready state is used to indicate that the hot-backup connection between a backup application server and a master application server is abnormal when the backup application server is not in failure, and the backup failure state is used to indicate that a backup application server is in failure.

As an embodiment, the method further includes: when it is detected that the master application server is in failure, if a recorded master application server state is a master active state, updating the recorded master application server state to a master failure state; where the master active state is used to indicate that a master application server works normally, and the master failure state is used to indicate that a master application server is in failure.

As an embodiment, the method further includes: when it is detected that the master application server is recovered from a failure, if a recorded master application server state is a master failure state, updating the recorded master application server state to a master active state; where the master active state is used to indicate that a master application server works normally, and the master failure state is used to indicate that a master application server is in failure.

In a second aspect, the embodiments of the present disclosure provide a method for switching between a master application server and a backup application server.

The method for switching between the master application server and the backup application server is applied to a management server, and the method includes: when it is detected that the master application server is in failure, if a backup application server state recorded by the management server is a backup ready state, querying for a connection state of a hot-backup connection between the master application server and the backup application server, where the backup ready state is used to indicate that the hot-backup connection between a backup application server and a master application server is abnormal when the backup application server is not in failure; and when a backup application server state indicated by the connection state is inconsistent with the backup application server state recorded by the management server, controlling the master application server and the backup application server to perform switching between the master application server and the backup application server.

As an embodiment, when it is detected that the master application server is in failure, if the recorded backup application server state is a backup active state, where the backup active state is used to indicate that a backup application server works normally, the method further includes: controlling the master application server and the backup application server to perform the switching between the master application server and the backup application server.

As an embodiment, the method further includes: when it is detected that the master application server is in failure, if a master application server state recorded by the management server is a master active state, updating the recorded master application server state to a master failure state; where the master active state is used to indicate that a master application server works normally, and the master failure state is used to indicate that a master application server is in failure.

As an embodiment, the method further includes: when it is detected that the master application server and the backup application server have completed the switching between the master application server and the backup application server, updating a recorded master application server state to a master active state, and updating the recorded backup application server state to a backup failure state; where the master active state is used to indicate that a master application server works normally, and the backup failure state is used to indicate that a backup application server is in failure.

As an embodiment, the method further includes: when it is detected that the backup application server is recovered from a failure, updating the recorded backup application server state to the backup ready state, where the backup ready state is used to indicate that the hot-backup connection between a backup application server and a master application server is abnormal when the backup application server is not in failure.

As an embodiment, the method further includes: when it is detected that the backup application server is successfully deployed, recording a master application server state as a master active state and the backup application server state as the backup ready state, where the backup ready state is used to indicate that the hot-backup connection between a backup application server and a master application server is abnormal when the backup application server is not in failure; and controlling the master application server and the backup application server to establish the hot-backup connection.

As an embodiment, after controlling the master application server and the backup application server to successfully establish the hot-backup connection, the method further includes: controlling the master application server to back up all stored business data to the backup application server through the hot-backup connection.

As an embodiment, if the recorded master application server state is the master active state, where the master active state is used to indicate that a master application server works normally, the method further includes: when it is found that the backup application server state indicated by the connection state is the backup ready state and the recorded backup application server state is a backup active state, controlling the master application server and the backup application server to restore the hot-backup connection.

As an embodiment, when it is detected that the backup application server is recovered from a failure, the method further includes: controlling the master application server and the backup application server to reestablish the hot-backup connection; if reestablishment of the hot-backup connection fails, updating a number of reestablishment failures; and when the updated number of the reestablishment failures is less than a set threshold, returning to the step of controlling the master application server and the backup application server to reestablish the hot-backup connection, when the updated number of the reestablishment failures is equal to the set threshold, clearing business data currently stored in the backup application server and setting the number of the reestablishment failures as an initial value, and returning to the step of controlling the master application server and the backup application server to reestablish the hot-backup connection.

As an embodiment, the method further includes: receiving a deletion instruction; and when the deletion instruction is used to instruct to delete a master application server, deleting the master application server, controlling the backup application server to delete locally recorded configuration information of the master application server, and controlling to switch a device role of the backup application server to a master application server when the recorded backup application server state is a backup active state; where the backup active state is used to indicate that a backup application server works normally; when the deletion instruction is used to instruct to delete a backup application server, deleting the backup application server and controlling the master application server to delete locally recorded configuration information of the backup application server.

As an embodiment, the method further includes: receiving an instruction of switching between the master application server and the backup application server; and if a recorded master application server state is a master active state and the recorded backup application server state is a backup active state, controlling the master application server and the backup application server to perform the switching between the master application server and the backup application server; otherwise, outputting a switching prohibition message.

In a third aspect, the embodiments of the present disclosure further provide an electronic device, including: a processor and a machine-readable storage medium; where the machine-readable storage medium stores machine executable instructions that can be executed by the processor; and the processor is configured to execute the machine executable instructions to realize any one of the above methods.

In a fourth aspect, the embodiments of the present disclosure further provide an apparatus, including: a querying unit, configured to query for a connection state of a hot-backup connection between a master application server and a backup application server; and an updating unit, configured to, when a backup application server state indicated by the connection state is inconsistent with a backup application server state recorded by a management server, update the backup application server state recorded by the management server to the backup application server state indicated by the connection state.

In a fifth aspect, the embodiments of the present disclosure further provide an apparatus, including: a detecting unit, configured to detect states of a master application server and a backup application server; a querying unit, configured to, when the detecting unit detects that the master application server is in failure, if a backup application server state recorded by a management server is a backup ready state, query for a connection state of a hot-backup connection between the master application server and the backup application server, where the backup ready state is used to indicate that the hot-backup connection between a backup application server and a master application server is abnormal when the backup application server is not in failure; and a master-backup switching unit, configured to, when a backup application server state indicated by the connection state is inconsistent with the backup application server state recorded by the management server, control the master application server and the backup application server to perform switching between the master application server and the backup application server.

In a sixth aspect, the embodiments of the present disclosure further provide a machine-readable storage medium storing machine executable instructions, when the machine executable instructions are executed by a processor, any one of the above methods is realized.

In a seventh aspect, the embodiments of the present disclosure further provide a computer program, when the computer program is executed by a processor, any one of the above methods is realized.

It can be seen from the above technical solutions that, in the present disclosure, based on the state management methods disclosed above, the management server timely updates the recorded backup application server state by querying for the connection state of the hot-backup connection between the master application server and the backup application server, so as to manage the master application server and the backup application server based on the recorded backup application server state. For example, when it is detected that the master application server is in failure, if the recorded backup application server state is a backup active state, the master application server and the backup application server are controlled to directly perform switching between the master application server and the backup application server.

In the present disclosure, based on the method for switching between the master application server and the backup application server disclosed above, when detecting that the master application server is in failure, instead of immediately controlling the master application server and the backup application server to perform the master-backup switching, the recorded backup application server state is checked. When the recorded backup application server state is the backup ready state, the connection state of the hot-backup connection between the master application server and the backup application server is further queried for. When the backup application server state indicated by the found connection state is the backup active state, the master application server and the backup application server are controlled to perform the switching between the master application server and the backup application server. This can avoid that, due to the interruption of the hot-backup connection between the master application server and the backup application server before the switching, a hot-backup connection cannot be established for data backup even if the backup application server has recovered from a failure after the switching, thus improving the high availability of data storage.

BRIEF DESCRIPTION OF THE DRAWINGS

The accompanying drawings, which are incorporated into and constitute a part of the specification, illustrate embodiments consistent with the present disclosure, and together with the specification serve to explain the principles of the present disclosure.

DETAILED DESCRIPTION OF THE EMBODIMENTS

To make the present disclosure easier to understand, a system involved in the present disclosure is described below.

Figure 1:
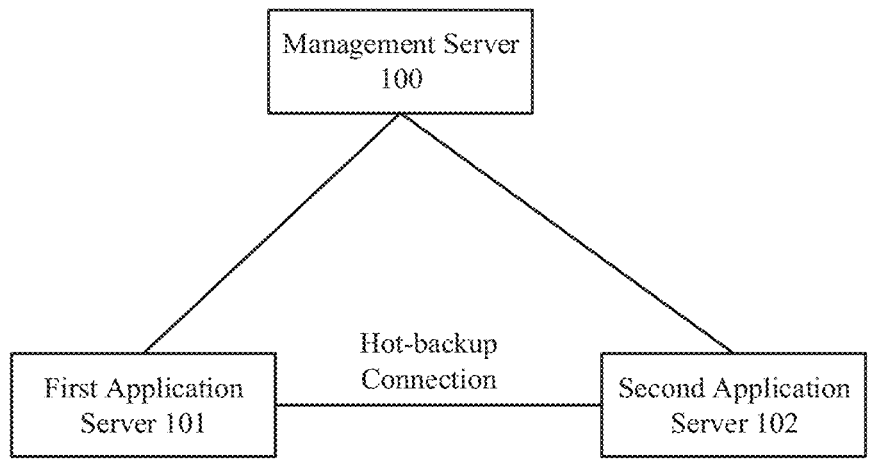
FIG. 1 is an architecture diagram illustrating a system according to an embodiment of the present disclosure.

Referring to FIG. 1, which is an architecture diagram illustrating a system according to an embodiment of the present disclosure. As shown in FIG. 1, the system may include a management server 100, a first application server 101, and a second application server 102.

The management server is configured to be responsible for web services and be responsible for managing the first application server and the second application server.

The first application server and the second application server have the same functions and are configured to provide application services and data storage. The first application server and the second application server are in a master-backup relationship with each other. The first application server currently plays a master role and can be referred to as a master application server. The second application server currently plays a backup role and can be referred to as a backup application server.

Based on the above system structure, a state management method provided by the present disclosure is described below through Embodiment 1.

Embodiment 1

Figure 2:
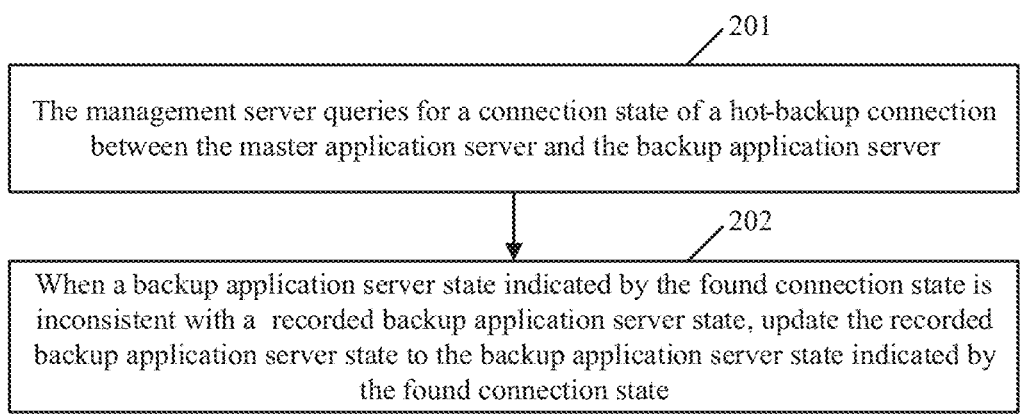
FIG. 2 is a flowchart illustrating a state management method according to Embodiment 1 of the present disclosure.

Referring to FIG. 2, which is a flowchart illustrating a state management method according to Embodiment 1 of the present disclosure. The process is applied to the above management server. As shown in FIG. 2, the process may include steps 201~202.

Step 201: the management server queries for a connection state of a hot-backup connection between the master application server and the backup application server.

Under normal conditions, there is a hot-backup connection between the master application server and the backup application server. The hot-backup connection is used for business data backup between the master application server and the backup application server to realize business data synchronization between the master application server and the backup application server. In an example, the master application server can back up locally newly added business data to the backup application server through the hot-backup connection during normal operation, so as to realize the business data synchronization between the master application server and the backup application server.

As for how the management server queries for the connection state of the hot-backup connection between the master application server and the backup application server, there are various implementation methods in the present disclosure, one of which will be described as an example in FIG. 3 below, and will not be repeated here.

Step 202: when a backup application server state indicated by the found connection state is inconsistent with a backup application server state recorded by the management server, the recorded backup application server state is updated to the backup application server state indicated by the found connection state.

Here, when the backup application server state indicated by the found connection state is inconsistent with the recorded backup application server state, it means that the recorded backup application server state is no longer the latest state of the backup application server. At this time, it is necessary to timely update the recorded backup application server state to the backup application server state indicated by the found connection state to accurately record the latest state of the backup application server.

In this embodiment, when the backup application server state indicated by the found connection state is consistent with the recorded backup application server state, it means that the recorded backup application server state is still the latest state of the backup application server, and the recorded backup application server state can be maintained.

So far, the process shown in FIG. 2 has been completed.

Through the process shown in FIG. 2, the management server timely updates the recorded backup application server state by querying for the connection state of the hot-backup connection between the master application server and the backup application server, so as to manage the master application server and the backup application server based on the recorded backup application server state. For example, when it is detected that the master application server is in failure, if the recorded backup application server state is a backup active state, the master application server and the backup application server are controlled to directly perform switching between the master application server and the backup application server (referred to as "master-backup switching" for short).

The management server querying for the connection state of the hot-backup connection between the master application server and the backup application server in step 201 is described below.

In an example, the management server can query for the connection state of the hot-backup connection between the master application server and the backup application server regularly (for example, every a period of time, such as every other second) or periodically (the period can be set according to the actual needs in advance), or in response to a trigger of an external event (for example, it is detected that the master application server recovers from a failure or it is detected that the backup application server recovers from a failure). The present disclosure does not limit this. An example of how the management server queries for the connection state of the hot-backup connection between the master application server and the backup application server is described below through FIG. 3.

Figure 3:
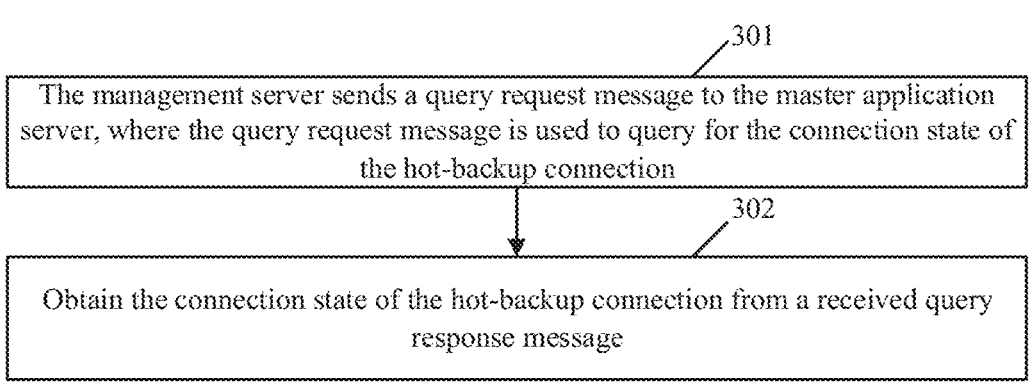
FIG. 3 is a flowchart illustrating the implementation of step 201 according to an embodiment of the present disclosure.

Referring to FIG. 3, which is a flowchart illustrating the implementation of step 201 according to an embodiment of the present disclosure. As shown in FIG. 3, the process may include steps 301~302.

Step 301: the management server sends a query request message to the master application server, where the query request message is used to query for the connection state of the hot-backup connection.

As described above, the management server can send the query request message to the master application server regularly (for example, every other second) or periodically (the period is set according to the actual needs in advance), or send the query request message to the master application server in response to a trigger of an external event (for example, it is detected that the master application server recovers from a failure, it is detected that the backup application server recovers from a failure, or the like). The present disclosure does not limit this.

Step 302: the connection state of the hot-backup connection carried by a received query response message is obtained from the query response message.

After the management server sends the query request message to the master application server, the master application server will return the query response message to the management server if the master application server receives the query request message. The query response message here carries the connection state of the hot-backup connection.

In an example, the management server receives the query response message within first set time after sending the query request message to the master application server. After receiving the query response message, as described in step 302, the management server will obtain the connection state of the hot-backup connection carried by the received query response message from the query response message. The first set time here can be set according to the actual conditions.

In another example, the management server may not receive the query response message within the first set time after sending the query request message to the master application server. Then, as an embodiment, the management server can send a query request message to the backup application server. When a query response message is received within second set time after sending the query request message to the backup application server, as described in step 302, the management server will obtain the connection state of the hot-backup connection carried by the received query response message from the query response message. It should be noted that, the first set time and the second set time here can be the same or different, which are not specifically limited in the present disclosure. It should also be noted that, in the case that the query response message is not received within the first set time after sending the query request message to the master application server, if the query request message is subsequently sent to the backup application server, under normal conditions, the management server will receive the query response message within the second set time after sending the query request message to the backup application server. Generally, the situation where the query response message is not received within the second set time after sending the query request message to the backup application server will not occur.

So far, the process shown in FIG. 3 has been completed. Through the process shown in FIG. 3, the management server can query for the connection state of the hot-backup connection between the master application server and the backup application server. It should be noted that, the management server queries for the connection state of the hot-backup connection between the master application server and the backup application server shown in FIG. 3, which is only an example and is not for limitation.

The situation where the backup application server state indicated by the connection state is inconsistent with the recorded backup application server state in step 202 is described below.

As an embodiment, the backup application server state indicated by the connection state is inconsistent with the recorded backup application server state, which may include:

When the backup application server state indicated by the connection state is a backup active state, if the recorded backup application server state is a backup ready state, it is determined that the backup application server state indicated by the connection state is inconsistent with the recorded backup application server state.

Here, the backup active state is used to indicate that a backup application server works normally. In an example, when the hot-backup connection is normal, the connection state of the hot-backup connection indicates that the backup application server state is the backup active state.

Here, the backup ready state is a newly added state for the backup application server in the present disclosure, and is between the backup active state and a backup failure state (used to indicate the backup application server is in failure). In an example, the backup ready state is used to indicate that the hot-backup connection between a backup application server and a master application server is abnormal when the backup application server is not in failure.

As another embodiment, the backup application server state indicated by the connection state is inconsistent with the recorded backup application server state, which may include:

when the backup application server state indicated by the connection state is the backup ready state, if the recorded backup application server state is the backup active state, it is determined that the backup application server state indicated by the connection state is inconsistent with the recorded backup application server state.

As described above, the backup ready state is used to indicate that the hot-backup connection between a backup application server and a master application server is abnormal when the backup application server is not in failure. In an example, when the backup application server is not in failure, if the hot-backup connection is abnormal, the connection state of the hot-backup connection indicates that the backup application server state is the backup ready state.

Through the above description of the inconsistency between the backup application server state indicated by the connection state and the recorded backup application server state, it can be seen that through the connection state of the hot-backup connection between the master application server and the backup application server, the latest state of the backup application server can be obtained in time, and the recorded backup application server state can be updated in time based on the latest state of the backup application server.

It should be noted that, in this embodiment, when the recorded backup application server state is the backup active state, and the backup application server state indicated by the found connection state is the backup ready state (that is, the backup application server state indicated by the connection state is inconsistent with the recorded backup application server state), it means that the hot-backup connection between the master application server and the backup application server changes from normal to abnormal, At this time, as an embodiment, the management server can control the master application server and the backup application server to attempt to restore the hot-backup connection. The controlling the master application server and the backup application server to attempt to restore the hot-backup connection here is similar to controlling the master application server and the backup application server to establish a hot-backup connection described later, which will not be repeated here. Once the attempt to restore the hot-backup connection is successful, in combination with the process shown in FIG. 2 above, the management server will find that the connection state of the hot-backup connection between the master application server and the backup application server indicates that the backup application server is the backup active state, which is inconsistent with the currently recorded backup application server state (backup ready state), and will timely update the currently recorded backup application server state (backup ready state) to the backup active state.

In specific applications, the backup application server may be in failure, and the master application server may be in failure, which will be described below.

The backup application server is in failure:

In an example, when the management server detects that the backup application server is in failure, if the recorded backup application server state is the backup active state or the backup ready state, the recorded backup application server state is updated to the backup failure state. If the recorded backup application server state is the backup failure state, the recorded backup application server state is still maintained as the backup failure state.

Here, the backup failure state is used to indicate a backup application server is in failure. The failure of the backup application server includes but is not limited to at least one of the following: interruption of the connection with the management server (also called backup application server offline), hardware failure (for example, at least one of network card failure, motherboard failure, chip failure, memory failure, power supply failure and other failures), software failure (for example, system failure and/or service failure, where the service failure includes at least one of database service stop, application service startup, etc.). It should be noted that, the reason why the application service startup is defined as the failure of the backup application server here is that this embodiment will set application services on the backup application server to a stop state to prevent interference with application services provided by the master application server. Therefore, once it is detected that the application services on the backup application server is not in the stop state but in a running state, it is determined that the backup application server is in failure.

It should be noted that the above mechanism for the management server to detect the failure of the backup application server (referred to as detection mechanism for short) may be different according to different types of failures. For example, taking the above interruption of the connection with the management server as an example, the corresponding detection mechanism is: the management server sends a heartbeat message to the backup application server, and if the management server does not receive a response to the heartbeat message within specified time, it is determined that the backup application server is in failure (the connection with the management server is interrupted or the backup application server is offline). Taking the above database service stop or application service startup as an example, the corresponding detection mechanism is: when the management server receives a failure message sent by the backup application server, the management server determines that the backup application server is in failure. In the embodiment of the present disclosure, the backup application server will detect the application services and database service on the backup application server regularly (for example, every other second) or periodically (for example, every second). Once it is detected that the application service startup and/or the database service stop, the above failure message will be sent, that is, the above failure message is sent based on the application service startup and/or the database service stop.

The failure of the backup application server has been described above. It should be noted that, the backup application server is not always in failure and may also recover from the failure. In an example, the management server can update the recorded backup application server state to the backup ready state when the management server detects that the backup application server recovers from the failure.

In addition, when detecting that the backup application server recovers from the failure, the management server can further control the master application server and the backup application server to reestablish the hot-backup connection. The steps of how to control the master application server and the backup application server to reestablish the hot-backup connection will be described later, which will not be repeated here.

When the master application server and the backup application server reestablish the hot-backup connection successfully, the hot-backup connection is normal. In combination with the process shown in FIG. 2 above, the management server will find that the connection state of the hot-backup connection between the master application server and the backup application server indicates that the backup application server state is the backup active state, which is inconsistent with the currently recorded backup application server state (backup ready state), and will timely update the currently recorded backup application server state (backup ready state) to the backup active state.

If the reestablishment of the hot-backup connection fails, the number of reestablishment failures is updated. Here, the failure of the establishment may be due to a conflict between business data stored by the master application server and business data stored by the backup application server (for example, the business data stored by the backup application server is not a subset of the business data stored by the master application server, and the backup application server stores data other than the business data stored by the master application server).

When the updated number of reestablishment failures is less than a set threshold, return to the step of controlling the master application server and the backup application server to reestablish the hot-backup connection. When the updated number of reestablishment failures is equal to the set threshold, business data currently stored by the backup application server is cleared and the number of the reestablishment failures is set as an initial value, and return to the step of controlling the master application server and the backup application server to reestablish the hot-backup connection. Here, the purpose of clearing the business data currently stored by the backup application server is to eliminate the conflict between the business data stored by the master application server and the business data stored by the backup application server (for example, the business data stored by the backup application server is not a subset of the business data stored by the master application server). When the business data currently stored by the backup application server is cleared, the master application server copies all the stored business data to back it up to the backup application server. At this time, the business data stored by the backup application server is a subset of the business data stored by the master application server, and when the master application server and the backup application server are controlled to reestablish the hot-backup connection later, the establishment will be successful.

The failure of the master application server is described below.

In an example, when the management server detects the master application server is in failure, if the recorded master application server state is the master active state, the recorded master application server state is updated to the master failure state. Here, the master active state is used to indicate that a master application server works normally. The master failure state is used to indicate that a master application server is in failure. The failure of the master application server here is similar to the above failure of the backup application server, including but not limited to at least one of the following: interruption of the connection with the management server (also called master application server offline), hardware failure (for example, at least one of network card failure, motherboard failure, chip failure, memory failure, power supply failure and other failures), software failure (for example, system failure and/or service failure, where the service failure includes at least one of database service stop, application service stop, etc.).

It should be noted that the mechanism for the management server to detect the failure of the master application server (referred to as detection mechanism for short) is similar to the mechanism for detecting the failure of the backup application server (referred to as detection mechanism for short). There can be different detection mechanisms according to different types of failures, which will not be repeated here.

The failure of the master application server has been described above.

It should be noted that, when the master application server is in failure, if master-backup switching occurs, a device role of the failed master application server at this time is switched to a backup application server. In this case, if the failure of the master application server is recovered, please refer to the above description of the backup application server recovering from the failure, which will not be repeated here.

In another case, when the master application server is in failure, the master-backup switching does not occur (the reason is that the conditions for the master-backup switching are not met at present, for example, the backup application server is also in failure at this time). In this case, when the failure is recovered and the management server detects that the master application server recovers from the failure, if the recorded master application server state is the master failure state, the recorded master application server state will be updated to the master active state.

Embodiment 1 has been described above.

Through Embodiment 1, the management server can timely update the recorded master application server state and the recorded backup application server state, and can manage the master application server and the backup application server based on the recorded master application server state and the recorded backup application server state. For example, when the failure of the master application server is detected, if the recorded backup application server state is the backup active state, the master application server and the backup application server are controlled to directly perform the master-backup switching.

Embodiment 2 is described below.

Embodiment 2

Embodiment 2 mainly describes how the management server controls the master-backup switching between the master application server and the backup application server based on the recorded backup application server state.

Figure 4:
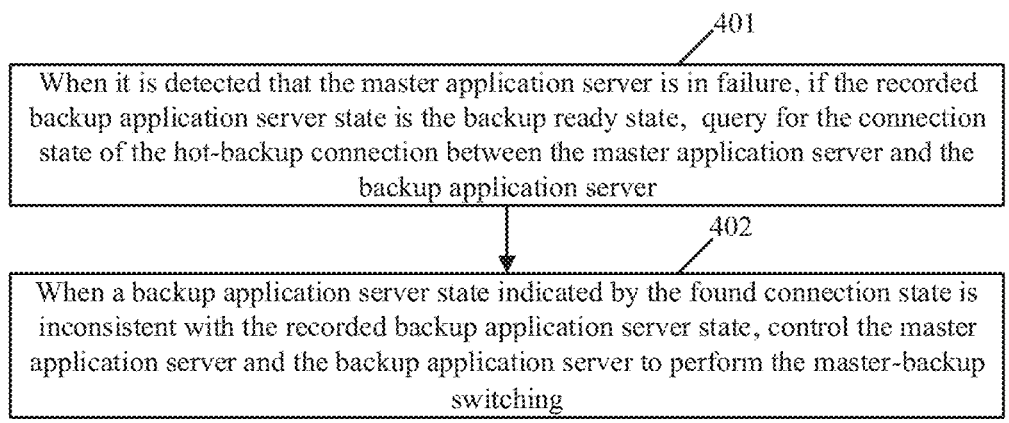
FIG. 4 is a flowchart illustrating master-backup switching according to Embodiment 2 of the present disclosure.

Referring to FIG. 4, which is a flowchart illustrating master-backup switching according to Embodiment 2 of the present disclosure. This process is applied to the management server. As shown in FIG. 4, the process may include steps 401~402.

Step 401: when it is detected that the master application server is in failure, if the recorded backup application server state is the backup ready state, the connection state of the hot-backup connection between the master application server and the backup application server is queried for.

Here, for querying for the connection state of the hot-backup connection between the master application server and the backup application server, please refer to the process shown in FIG. 3 above, which will not be repeated here.

Step 402: when a backup application server state indicated by the found connection state is inconsistent with the recorded backup application server state, the master application server and the backup application server are controlled to perform the master-backup switching.

In step 402, the backup application server state indicated by the found connection state is inconsistent with the recorded backup application server state, which means that the backup application server state indicated by the found connection state is the backup active state and the recorded backup application server state is the backup ready state.

It should be noted that, the reason why the backup application server state indicated by the found connection state is inconsistent with the recorded backup application server state is that the recorded backup application server state, that is, the backup ready state is not the current latest server state of the backup application server. On the basis that the backup application server state indicated by the found connection state is the backup active state, it can be known that the current latest server state of the backup application server is the backup active state, that is, the backup application server state indicated by the found connection state is inconsistent with the recorded backup application server state.

When the backup application server state indicated by the connection state is the backup active state, it means that the current latest state of the backup application server is the backup active state (indicating that the backup application server works normally). Based on this, on the premise that it is detected that the master application server is in failure in step 401, the backup application server can completely take over the work of the failed master application server through the master-backup switching (that is, as described in step 402, the management server controls the master application server and the backup application server to directly perform the master-backup switching).

In an example, controlling the master application server and the backup application server to perform the master-backup switching can include: controlling a device role of the master application server to be switched to a backup application server, and a device role of the original backup application server to be switched to a new master application server to continue to provide application services.

So far, the process shown in FIG. 4 has been completed.

It can be seen from the process shown in FIG. 4 that when it is detected that the master application server is in failure, instead of immediately controlling the master application server and the backup application server to perform the master-backup switching, the recorded backup application server state is checked first. When the recorded backup application server state is the backup ready state, the connection state of the hot-backup connection between the master application server and the backup application server is further queried for. When the backup application server state indicated by the found connection state is the backup active state, the master application server and the backup application server are controlled to perform the master-backup switching. This can avoid that, due to the interruption of the hot-backup connection between the master application server and the backup application server before the master-backup switching, a hot-backup connection cannot be established for data backup even if the backup application server (i.e. the master application server before the master-backup switching) has recovered from a failure after the master-backup switching, thus improving the high availability of data storage.

It should be noted that the process shown in FIG. 4 is performed when the recorded backup application server state is the backup ready state. If the recorded backup application server state is the backup active state, the master application server and the backup application server can be controlled to directly perform the master-backup switching.

In addition, in this embodiment, when it is detected that the master application server is in failure, if the recorded master application server state is the master active state, the management server can also update the recorded master application server state to the master failure state, so as to timely update the recorded master application server state and ensure that the recorded master application server state can accurately reflect the state of the master application server.

In addition, in this embodiment, when the master application server and the backup application server complete the master-backup switching, it means that states of the master application server and the backup application server change, and the management server needs to update the recorded master application server state and the recorded backup application server in time. In an example, when detecting that the master application server and the backup application server have completed the master-backup switching, the management server will update the recorded master application server state to the master active state and update the recorded backup application server state to the backup failure state.

It should be noted that, after the master application server and the backup application server complete the master-backup switching, the device role of the failed original master application server is switched to a backup application server. However, the failure does not always exist, and the failed original master application server may recover from the failure. For the recovering from the failure, please refer to the description of how the backup application server recovers from the failure described in Embodiment 1 above.

Figure 5:
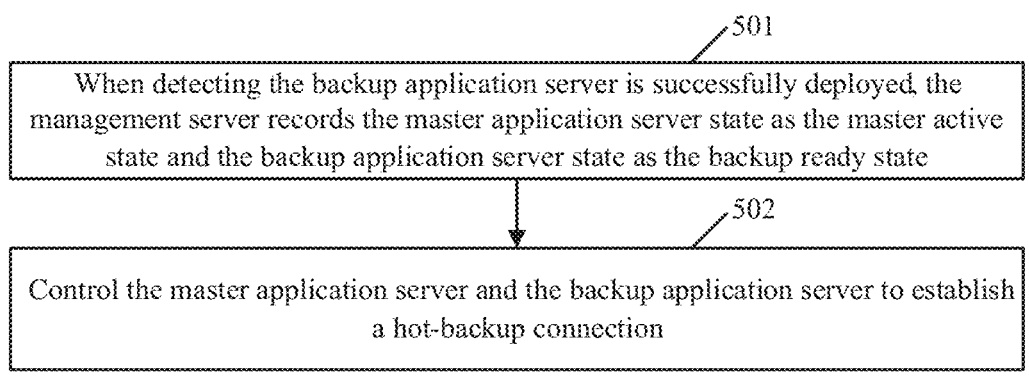
FIG. 5 is a flowchart illustrating deployment of a backup application server according to an embodiment of the present disclosure.

In addition, before Embodiment 1 and/or Embodiment 2, the deployment process of the backup application server shown in FIG. 5 can be further performed:

Referring to FIG. 5, which is a flowchart illustrating the deployment of the backup application server according to an embodiment of the present disclosure. As shown in FIG. 5, the process includes steps 501~502.

Step 501: when detecting the backup application server is successfully deployed, the management server records the master application server state as the master active state and the backup application server state as the backup ready state.

After the backup application server is successfully deployed, relevant instructions from a user will be sent to the management server. When the management server receives the above relevant instructions, it is determined that the successful deployment of the backup application server has been detected.

In an example, before the management server detects the successful deployment of the backup application server, there is no local record on the states of the master application server and the backup application server. Based on this, when detecting the successful deployment of the backup application server, the management server records the master application server state as the master active state and the backup application server state as the backup ready state.

In another example, before the management server detects the successful deployment of the backup application server, the states of the master application server and the backup application server have been recorded locally (both are an initial state). Based on this, when detecting the successful deployment of the backup application server, the management server will update the master application server state from the initial state to the master active state, and update the backup application server state from the initial state to the backup ready state. Finally, the master application server state is recorded as the master active state and the backup application server is recorded as the backup ready state.

Step 502: the master application server and the backup application server are controlled to establish a hot-backup connection.

How to control the master application server and the backup application server to establish the hot-backup connection in step 502 will be described later, and will not repeated here.

So far, the process shown in FIG. 5 has been completed.

Through the process shown in FIG. 5, after successfully deploying the backup application server, the master application server state and the backup application server state are timely recorded, and the master application server and the backup application server are controlled to establish the hot-backup connection.

After the master application server and the backup application server are controlled to successfully establish the hot-backup connection in step 502, the hot-backup connection is normal. In combination with the process shown in FIG. 2 above, the management server will find that the connection state of the hot-backup connection between the master application server and the backup application server indicates that the backup application server state is the backup active state, which is inconsistent with the currently recorded backup application server state (backup ready state), and will timely update the currently recorded backup application server state (backup ready state) to the backup active state.

In addition, after controlling the master application server and the backup application server to successfully establish the hot-backup connection, the management server will also control to perform a basic backup between the master application server and the backup application server. In an example, controlling to perform the basic backup between the master application server and the backup application server may include: controlling the master application server to back up all stored business data to the backup application server through the hot-backup connection (that is, the master application server copies all the stored business data to back it up to the backup application server).

In an example, the following situation will also occur: the hot-backup connection between the master application server and the backup application server changes from normal to abnormal. Here, the hot-backup connection between the master application server and the backup application server changing from normal to abnormal includes: if the recorded master application server state is the master active state and the recorded backup application server state is the backup active state, when it is found that the backup application server state indicated by the connection state is the backup ready state, it means that the hot-backup connection between the master application server and the backup application server changes from normal to abnormal.

When the hot-backup connection between the master application server and the backup application server changes from normal to abnormal, as an embodiment, the master application server and the backup application server can be controlled to attempt to restore the hot-backup connection. The controlling the master application server and the backup application server to attempt to restore the hot-backup connection here is similar to controlling the master application server and the backup application server to establish the hot-backup connection described later, which will not be repeated here. It should be noted that, once the attempt to restore the hot-backup connection is successful, the above basic backup will not be carried out between the master application server and the backup application server to reduce the backup pressure.

So far, the description of Embodiment 2 has been completed.

Through Embodiment 2, when detecting that the master application server is in failure, instead of immediately controlling the master application server and the backup application server to perform the master-backup switching, the management server first checks the recorded backup application server state. When the recorded backup application server state is the backup active state, the master application server and the backup application server are controlled to perform the master-backup switching. When the recorded backup application server state is the backup ready state, the connection state of the hot-backup connection between the master application server and the backup application server is further queried for. When the backup application server state indicated by the found connection state is the backup active state, the master application server and the backup application server are controlled to perform the master-backup switching. This can avoid that, due to the interruption of the hot-backup connection between the master application server and the backup application server before the master-backup switching, a hot-backup connection cannot be established for data backup even if the backup application server has recovered from a failure after the master-backup switching, thus improving the high availability of data storage.

Embodiment 3 is described below.

Example 3

Figure 6:
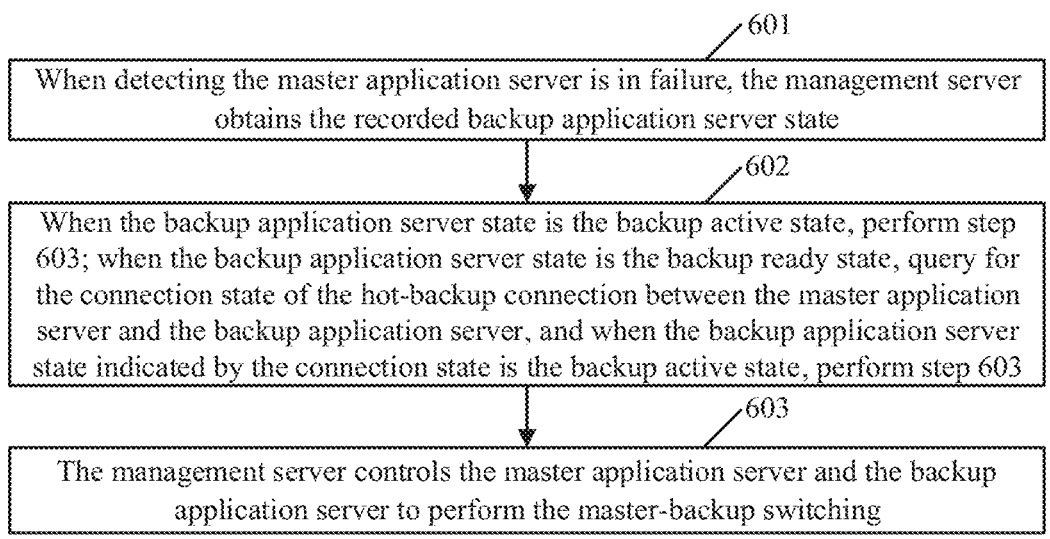
FIG. 6 is a flowchart illustrating switching between a master application server and a backup application server according to Embodiment 3 of the present disclosure.

Referring to FIG. 6, which is a flowchart according to Embodiment 3 of the present disclosure. As shown in FIG. 6, the process can include steps 601~603.

Step 601: when detecting the master application server is in failure, the management server obtains the recorded backup application server state.

In an example, when detecting the master application server is in failure, the management server can further update the recorded master application server state from the master active state to the master failure state to record the latest state of the master application server in time.

The failure of the master application server here is described above and will not be repeated here.

Step 602: when the backup application server state is the backup active state, step 603 is performed; when the backup application server state is the backup ready state, the connection state of the hot-backup connection between the master application server and the backup application server is queried for, and when the backup application server state indicated by the connection state is the backup active state, step 603 is performed.

As described above, when the hot-backup connection between the master application server and the backup application server is normal, the connection state of the hot-backup connection between the master application server and the backup application server indicates that the backup application server state is the backup active state.

In Embodiment 3, the connection state of the hot-backup connection between the master application server and the backup application server is queried for when the backup application server state is the backup ready state. The reason is that the backup application server state, that is, the backup ready state as a recorded state, is not the current latest server state of the backup application server. To prevent the delay of the master-backup switching due to the abnormal hot-backup connection, the connection state of the hot-backup connection between the master application server and the backup application server can be further queried for, so that the master-backup switching in step 603 can be performed when the backup application server state indicated by the connection state is the backup active state, which can realize the timeliness of the master-backup switching.

It should be noted that, in this embodiment, when the backup application server state indicated by the connection state is the backup active state, the management server will also update the recorded backup application server state from the backup ready state to the backup active state.

Step 603: the management server controls the master application server and the backup application server to perform the master-backup switching.

In an example, step 603 is performed when the recorded backup application server state is the backup active state. As described above, the backup active state is used to indicate that a backup application server works normally. When the backup application server works normally, it means that the hot-backup connection is not interrupted before the master-backup switching. There will be no problem that, due to the interruption of the hot-backup connection between the master application server and the backup application server before the master-backup switching, a hot-backup connection cannot be established for data backup even if the backup application server has recovered from a failure after the master-backup switching. Therefore, the master application server and the backup application server can be controlled to perform the master-backup switching at this time.

In another example, step 603 is performed when the recorded backup application server state is the backup ready state. As described above, although the backup application server state recorded by the management server is the backup ready state, the latest state of the backup application server is the backup active state by querying for the connection state of the hot-backup connection between the master application server and the backup application server. As described above, the backup active state is used to indicate that the backup application server works normally. When the backup application server works normally, it means that the hot-backup connection is not interrupted before the master-backup switching. There will be no problem that, due to the interruption of the hot-backup connection between the master application server and the backup application server before the master-backup switching, a hot-backup connection cannot be established for data backup even if the backup application server has recovered from a failure after the master-backup switching. Therefore, the master application server and the backup application server can be controlled to perform the master-backup switching at this time.

As an embodiment, in the above step 603, when it is detected that the master application server and the backup application server have completed the master-backup switching, the recorded master application server state is updated to the master active state, the recorded backup application server state is updated to the backup failure state, so as to timely record the latest states of the master application server and the backup application server, so that the master application server and the backup application server can be managed based on the latest recorded master application server state and the backup application server state.

So far, the process shown in FIG. 6 has been completed.

It can be seen from the process shown in FIG. 6 that when detecting the master application server is in failure, instead of immediately controlling the master application server and the backup application server to perform the master-backup switching, the management server first obtains the recorded backup application server state. When the backup application server state is the backup active state, the master application server and the backup application server are controlled to perform the master-backup switching. When the backup application server state is the backup ready state, the connection state of the hot-backup connection between the master application server and the backup application server is queried for. When the backup application server state indicated by the connection state is the backup active state, the master application server and the backup application server are controlled to perform the master-backup switching, which can avoid the problems such as affecting the high availability of data storage caused by the interruption of the hot-backup connection during the master-backup switching, thus improving the high availability of data storage.

Further, when detecting that the master application server and the backup application server have completed the master-backup switching, the management server also timely updates the recorded master application server state to the master active state, and updates the recorded backup application server state to the backup failure state, so as to timely record the latest states of the master application server state and the backup application server, so that the master application server and the backup application server can be managed based on the latest recorded master application server state and the backup application server state.

As described above, after the master application server and the backup application server are controlled by the management server to complete the master-backup switching, the device role of the failed original master application server is switched to a backup application server. However, the failure does not always exist, and the backup application server may also recover from the failure. For the recovering from the failure, please refer to the description of how the backup application server recovers from the failure described in Embodiment 1 above.

Thus, the description of Embodiment 3 has been completed.

As an embodiment, the master application server state and the backup application server state in the above embodiments 1 to 3 can be recorded by means of a state machine.

The following describes how to record the master application server state and the backup application server by means of the state machine.

In an example, a state of the state machine includes a combination of the master application server state and the backup application server state. That is, the current state of the state machine includes the master application server state and the backup application server state.

Based on the master application server state and the backup application server state described above, it can be known that the combination of the master application server state and the backup application server state mainly includes the following six states, which also means that the state machine mainly includes the following six states:

(1) A master active-backup ready state, used to indicate that the master application server state is the master active state and the backup application server state is the backup ready state;

(2) A master active-backup active state, used to indicate that the master application server state is the master active state and the backup application server state is the backup active state;

(3) A master active-backup failure state, used to indicate that the master application server state is the master active state and the backup application server state is the backup failure state;

(4) A master failure-backup ready state, used to indicate that the master application server state is the master failure state and the backup application server state is the backup ready state;

(5) A master failure-backup active state, used to indicate that the master application server state is the master failure state and the backup application server state is the backup active state;

(6) A master failure-backup failure state, used to indicate that the master application server state is the master failure state and the backup application server state is the backup failure state.

Based on the above description of the state machine, obtaining the recorded backup application server state in the above step 601 may include obtaining the backup application server state in the current state of the local state machine.

It should be noted that, in this embodiment, the state machine presents different states based on different system events. In an example, system events may include: failure of the master application server (such as offline, application service stop, database service stop), recovery of the master application server (such as from offline to online, application service from stop to operation, database service from stop to operation), failure of the backup application server (such as offline, database service stop), recovery of the backup application server (for example, from offline to online, database service from stop to operation), normal connection state of the hot-backup connection, abnormal connection state of the hot-backup connection, master-backup switching instruction, master-backup switching and other events.

In this embodiment, when monitoring any of the above system events, the management server updates the current state of the state machine to the state corresponding to the system event according to the defined state corresponding to the system event. The following describes how to update the state of the state machine based on system events by example.

Figure 7:
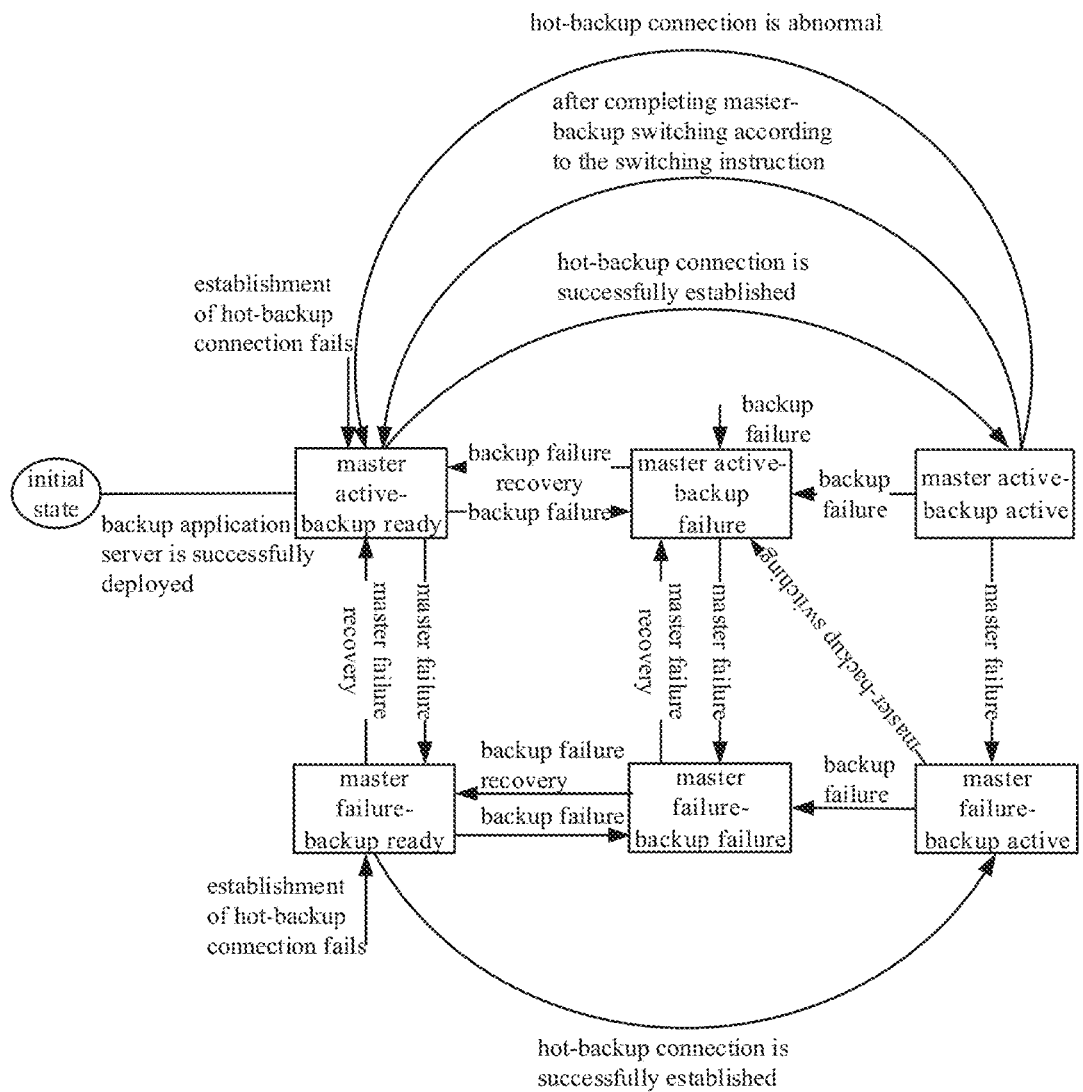
FIG. 7 is a schematic diagram illustrating state transition of a state machine according to an embodiment of the present disclosure.

Initially, when detecting that the backup application server is successfully deployed, the management server updates the current state of the local state machine from the initial state to the master active-backup ready state, as shown in a schematic diagram of state transition shown in FIG. 7.

Then the management server controls the master application server and the backup application server to establish a hot-backup connection.

In an example, the management server controls the master application server and the backup application server to establish the hot-backup connection can include: the management server sends a message to establish a hot-backup connection to the master application server and the backup application server respectively. The message to establish the hot-backup connection sent to the backup application server carries first address information of the master application server, and the message to establish the hot-backup connection sent to the master application server carries second address information of the backup application server. When receiving the message to establish the hot-backup connection, the backup application server will record the first address information carried by the received message to establish the hot-backup connection to a local database. When receiving the message to establish the hot-backup connection, the master application server will record the second address information carried by the received message to establish the hot-backup connection to the local database. Then, the backup application server sends a hot-backup connection request to the master application server according to the above first address information. When checking that source address information of the hot-backup connection request is the above second address information recorded in the local database, the master application server responds to establish the hot-backup connection between the master application server and the backup application server (for example, a hot-backup connection between a database of the master application server and a database of the backup application server). That is, the control of the master application server and the backup application server to establish the hot-backup connection is finally realized.

In an example, the management server can regularly query for the connection state of the hot-backup connection. For details of querying for the connection state of the hot-backup connection, please refer to the process shown in FIG. 3 above.

When it is found the hot-backup connection is successfully established (that is, the system event is that the connection state of the hot-backup connection is normal), the current state of the local state machine will be updated from the master active-backup ready state to the master active-backup activity state. It should be noted that, if the establishment of the hot-backup connection fails, when the number of establishment failures is less than a set value, return to control master application server and backup application server to establish the hot-backup connection. At this time, the current state of the local state machine remains the master active-backup ready state. Taking the successful establishment of the hot-backup connection as an example, this embodiment is described below.

In an example, since the hot-backup connection is successfully established for the first time, the management server can control all business data in the master application server to be backed up to the backup application server through the hot-backup connection (that is, all business data stored in the database in the master application server is copied and backed up to the database of the backup application server). At this time, the current state of the local state machine is the master active-backup active state.

In an example, when the current state of the local state machine is the master active-backup active state, if the management server detects a failure of the master application server (the system event is failure of the master application server) after a period of time, the current state of the local state machine will be updated from the master active-backup active state to the master failure-backup active state. When the current state of the local state machine is the master failure-backup active state, a system event for master-backup switching is generated to control the master application server and the backup application server to perform the master-backup switching. The operation after controlling the master application server and the backup application server to perform the master-backup switching will be described later, which is not described here.

In another example, when the current state of the local state machine is the master active-backup active state, if the management server finds that the connection state of the hot-backup connection changes from normal to abnormal after a period of time (that is, the system event is abnormal connection state of the hot-backup connection), the current state of the local state machine will be updated from the master active-backup active state to the master active-backup ready state. In addition, the management server also sends reset messages to the backup application server and the master application server respectively to control the master application server and the backup application server to attempt to restore the hot-backup connection. The controlling of the master application server and the backup application server to attempt to restore the hot-backup connection is similar to the method of establishing the hot-backup connection described above, will not be repeated here. It should be noted that the number of recovery of the hot-backup connection is limited to, for example, N (times). If the number of recovery is less than N, return to the above step of controlling the master application server and the backup application server to attempt to restore the hot-backup connection. When the number of recovery is equal to N, manual repair is required, and the probability of this situation is relatively small.

If a failure of the master application server is detected during the attempt to restore the hot-backup connection (the system event is failure of the master application server), the current state of the local state machine will be updated from the master active-backup ready state to the master failure-backup ready state.

If the hot-backup connection is not successfully restored, the master-backup switching will not be carried out even if the master application server fails. When it is detected that the hot-backup connection is successfully restored (i.e., the system event is normal connection state of the hot-backup connection), the current state of the local state machine will be updated from the master failure-backup ready state to the master failure-backup active state. When the current state of the local state machine is the master failure-backup active state, a system event for master-backup switching is generated to control the master application server and the backup application server to perform the master-backup switching.

After controlling the master application server and the backup application server to complete the master-backup switching, the management server updates the current state of the local state machine from the master failure-backup active state to the master active-backup failure state.

If it is detected that the backup application server recovers from the failure after a period of time (the system event is recovery of the backup application server), the current state of the local state machine will be updated from the master active-backup failure state to the master active-backup ready state. In addition, the management server further controls the master application server and the backup application server to reestablish the hot-backup connection. For details, refer to the above operation of establishing the hot-backup connection.

When the hot-backup connection is successfully reestablished (i.e., the system event is normal connection state of the hot-backup connection), the current state of the local state machine is updated from the master active-backup ready state to the master active-backup active state. This realizes the automatic recovery to the best state when the failed backup application server recovers from the failure, and ensures the high availability of the system as much as possible.

When reestablishment of the hot-backup connection fails (for example, it may be because the business data stored by the backup application server is not a subset of the business data stored by the master application server), if a cumulative number of reestablishment failures is less than a set threshold, return to the step of controlling the master application server and the backup application server to reestablish the hot-backup connection. If the cumulative number of reestablishment failures is equal to the set threshold, the business data stored in the backup application server is cleared, the cumulative number of reestablishment failures is set as an initial value, and return to the above step of controlling the master application server and the backup application server to reestablish the hot-backup connection. This can ensure the automatic recovery to the best state when the failed backup application server recovers from the failure, and ensures the high availability of the system as much as possible. FIG. 7 simply illustrates a schematic diagram of state transition of the above state machine.

It should be noted that the above only describes the state transition of the state machine with several system events as examples, not for limitation. In some applications, there may also be system events such as recovery of the master application server, failure of the backup application server, and master-backup switching instruction.

In an example, when a system event is monitored, for example, the recovery of the master application server, the master application server state in the current state of the state machine will be updated from the master failure state to the master active state.

In an example, when a system event is monitored, for example, the failure of the backup application server, the backup application server state in the current state of the state machine will be updated from the backup activity state or backup ready state to the backup failure state.

In an example, when the master-backup switching instruction is monitored (such as the instruction entered when manual switching is required based on demand), if checking that the recorded master application server state is the master active state and the backup application server state is the backup active state (i.e., the current state of the state machine is the master active-backup active state), the management server controls the master application server and the backup application server to perform the master-backup switching. Otherwise, a switching prohibition message is output. That is, in this embodiment, the above user manual switching is allowed only when the master application server state is the master active state and the backup application server state is the backup active state. This can meet the needs of users for manual switching while ensuring the high availability of data and application services. In an example, after controlling the master application server and the backup application server to perform the master-backup switching, the current state of the state machine can be updated from the master active-backup active state to the master active-backup ready state, and the master application server and the backup application server can be controlled to reestablish the hot-backup connection. When the master application server and the backup application server reestablish the hot-backup connection successfully (that is, the system event is normal connection state of the hot-backup connection), the current state of the local state machine is updated from the master active-backup ready state to the master active-backup active state. Otherwise, the current state of the local state machine is maintained as the master active-backup ready state. It should be noted that, when the master-backup switching is not successfully performed according to the master-backup switching instruction, the state can be rolled back. At this time, the current state of the local state machine still maintains the master active-backup active state.

It should be noted that, in the above embodiments 1 to 3, the master application server or the backup application server can also be deleted dynamically. Here, dynamically deleting the master application server or the backup application server may include:

receiving a deletion instruction; and when the deletion instruction is used to instruct to delete a master application server, deleting the master application server, controlling the backup application server to delete locally recorded configuration information of the master application server, and controlling to switch a device role of the backup application server to a master application server when the recorded backup application server state is the backup active state. As an embodiment, after controlling to switch the device role of the backup application server to the master application server, the recorded master application server state can be updated to the master active state. The recorded backup application server state can be updated from the backup activity state to an initial state, or the recorded backup application server state can be deleted. It should be noted that, if the recorded backup application server state is the backup failure state or the backup ready state, the backup application server state can be maintained.

When the deletion instruction is used to instruct to delete a backup application server, the backup application server is deleted and the master application server is controlled to delete locally recorded configuration information of the backup application server to prevent data leakage.

The methods provided by the embodiments of the present disclosure have been described above. Based on the above description, the system shown in FIG. 1 is described as an example below.

Figure 8:
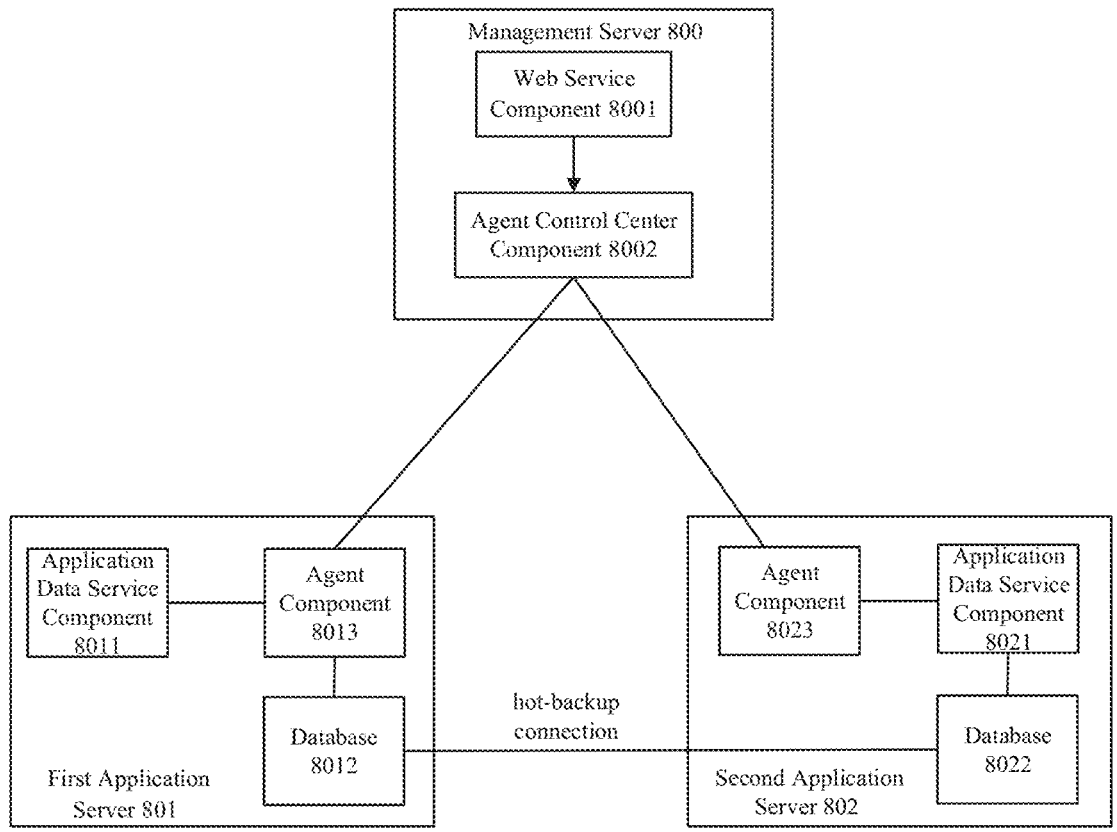
FIG. 8 is structural diagram illustrating an example of a system according to an embodiment of the present disclosure.

Referring to FIG. 8, which is structural diagram illustrating an example of a system according to an embodiment of the present disclosure. In an example, the system may include a management server 800, a first application server 801 and a second application server 802. The functions of the management server 800, the first application server 801 and the second application server 802 are same as those of the management server, the first application server and the second application server shown in FIG. 1.

In an example, the management server 800 may include a web service component 8001 and an agent control center component 8002. The web service component is responsible for web services, system configuration, network access, management and other services (here, the web service component is not the focus of the present disclosure, and is not specifically described in the present disclosure). The agent control center component interacts with the first application server and the second application server respectively on behalf of the management server (refer to the interactions between the management server and the master application server/the backup application server described in embodiments 1 to 3 above).

In an example, the first application server and the second application server have the same structure. As shown in FIG. 8, both the first application server and the second application server include an application data service component 8011/8021, a database 8012/8022 and an agent component 8013/8023. The application data service component is configured to provide application services. The database is configured to store business data. The agent component interacts with the management server on behalf of the application server where the agent component is located. For example, the agent component 8013 in the first application server currently serving as the master application server interacts with the management server on behalf of the first application server (refer to the interaction between the master application server and the management server described in embodiments 1 to 3 above). For another example, the agent component 8023 in the second application server currently serving as the backup application server interacts with the management server on behalf of the second application server (agent the interaction between the backup application server and the management server described in embodiments 1 to 3 above).

The system provided by the embodiments of the present disclosure has been described above, and an apparatus and an electronic device provided by the embodiments of the present disclosure are described below.

Figure 9:
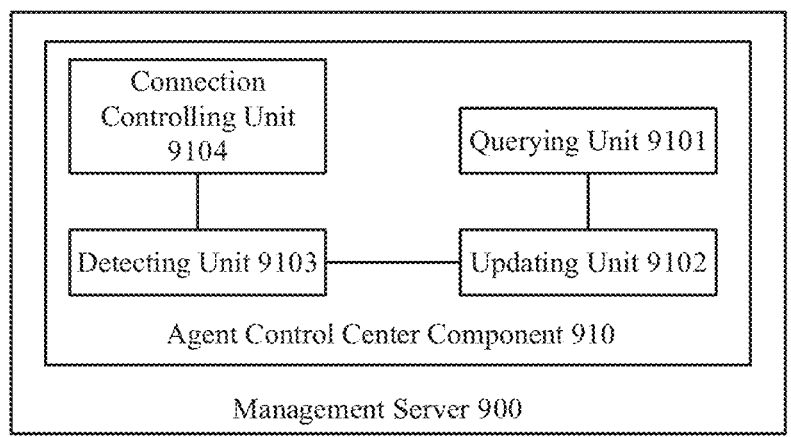
FIG. 9 is a structural diagram illustrating an apparatus according to an embodiment of the present disclosure.

Referring to FIG. 9, which is a structural diagram illustrating an apparatus according to an embodiment of the present disclosure. The apparatus is applied to a management server 900, which can specifically correspond to the above Embodiment 1. As shown in FIG. 9, the apparatus may include an agent control center component 910.

In an example, the agent control center component 910 may include a querying unit 9101 and an updating unit 9102.

In an example, the apparatus includes a querying unit and an updating unit.

The querying unit is configured to query for a connection state of a hot-backup connection between a master application server and a backup application server.

The updating unit is configured to, when a backup application server state indicated by the connection state is inconsistent with a backup application server state recorded by a management server, update the recorded backup application server state to the backup application server state indicated by the connection state.

As an embodiment, the querying unit queries for the connection state of the hot-backup connection between the master application server and the backup application server, including: sending a query request message to the master application server, where the query request message is used to query for the connection state of the hot-backup connection; and obtaining the connection state of the hot-backup connection carried by a received query response message from the query response message.

As an embodiment, the backup application server state indicated by the connection state is inconsistent with the recorded backup application server state, including:

when the backup application server state indicated by the connection state is a backup active state, if the recorded backup application server state is a backup ready state, it is determined that the backup application server state indicated by the connection state is inconsistent with the recorded backup application server state; where the backup active state is used to indicate that a backup application server works normally, and when the hot-backup connection is normal, the connection state of the hot-backup connection indicates that the backup application server state is the backup active state; the backup ready state is used to indicate that the hot-backup connection between a backup application server and a master application server is abnormal when the backup application server is not in failure.

As an embodiment, the backup application server state indicated by the connection state is inconsistent with the recorded backup application server state, including: when the backup application server state indicated by the connection state is a backup ready state, if the recorded backup application server state is a backup active state, it is determined that the backup application server state indicated by the connection state is inconsistent with the recorded backup application server state; where the backup ready state is used to indicate that the hot-backup connection between a backup application server and a master application server is abnormal when the backup application server is not in failure, and when the backup application server is not in failure, if the hot-backup connection is abnormal, the connection state of the hot-backup connection indicates the backup application server state is the backup ready state.

As an embodiment, the apparatus further includes a detecting unit. As shown in FIG. 9, when the apparatus includes an agent control center component, the agent control center component further includes a detecting unit 9103.

The detecting unit is configured to detect states of the backup application server state and the master application server.

As an embodiment, the updating unit is further configured to:

when the detecting unit detects that the backup application server is in failure, if the recorded backup application server state is a backup active state or a backup ready state, update the recorded backup application server state to a backup failure state; and/or, when the detecting unit detects that the backup application server has recovered from a failure, update the recorded backup application server state to the backup ready state; and/or, when the detecting unit detects that the master application server is in failure, if a recorded master application server state is a master active state, update the recorded master application server state to a master failure state; and/or, when the detecting unit detects that the master application server has recovered from a failure, if the recorded master application server state is the master failure state, update the recorded master application server state to the master active state; and/or, when the detecting unit detects that the backup application server is successfully deployed, record the master application server state as the master active state and the backup application server state as the backup ready state.

In an embodiment, the apparatus further includes a connection controlling unit. As shown in FIG. 9, when the apparatus includes an agent control center component, the agent control center component further includes:

a connection controlling unit 9104 is configured to, when the detecting unit detects that the backup application server is successfully deployed, control the master application server and the backup application server to establish a hot-backup connection, and control the master application server to back up all stored business data to the backup application server through the hot-backup connection after controlling the master application server and the backup application server to successfully establish the hot-backup connection.

As an embodiment, the connection controlling unit further controls the master application server and the backup application server to restore the hot-backup connection when the recorded master application server state is the master active state, the querying unit finds that the backup application server state indicated by the connection state is the backup ready state and the recorded backup application server state is the backup active state.

As an embodiment, the connection controlling unit further controls the master application server and the backup application server to reestablish the hot-backup connection when the detecting unit detects that the backup application server has recovered from a failure. If the reestablishment fails, the number of reestablishment failures is updated. When the updated number of reestablishment failures is less than a set threshold, return to the step of controlling the master application server and the backup application server to reestablish the hot-backup connection. When the updated number of reestablishment failures is equal to the set threshold, the business data currently stored in the backup application server is cleared, the number of reestablishment failures is set as an initial value, and return to the step of controlling the master application server and the backup application server to reestablish the hot-backup connection.

As an embodiment, the updating unit further receives a deletion instruction. When the deletion instruction is used to instruct to delete a master application server, the master application server is deleted, the backup application server is controlled to delete locally recorded configuration information of the master application server, and a device role of the backup application server is controlled to be switched to a master application server when the recorded backup application server state is the backup active state. When the deletion instruction is used to instruct to delete a backup application server, the backup application server is deleted and the master application server is controlled to delete locally recorded configuration information of the backup application server.

So far, the description of the apparatus shown in FIG. 9 has been completed.

Figure 10:
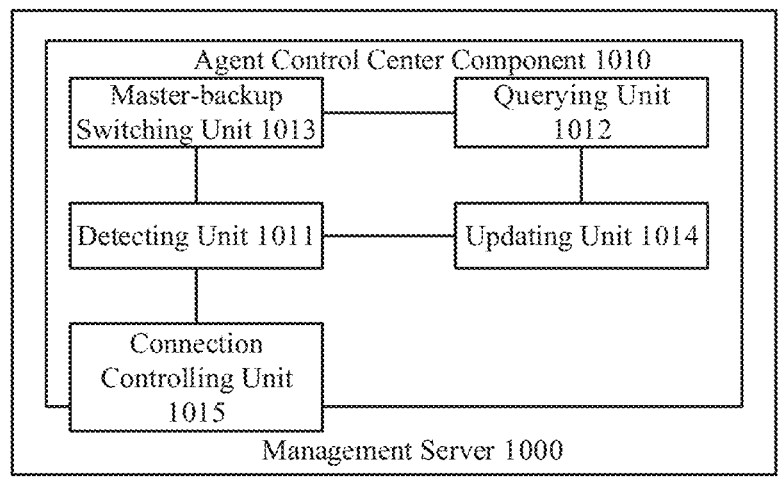
FIG. 10 is a structural diagram illustrating another apparatus according to an embodiment of the present disclosure.

Referring to FIG. 10, which is a structural diagram illustrating another apparatus according to an embodiment of the present disclosure. The apparatus is applied to a management server 1000, which can specifically correspond to the above Embodiment 2. As shown in FIG. 10, the apparatus may include an agent control center component 1010.

The agent control center component can include a detecting unit 1011, a querying unit 1012 and a master-backup switching unit 1013.

In an example, the apparatus includes a detecting unit, a querying unit and an master-backup switching unit.

Here, the function of the detecting unit is similar to that of the detecting unit shown in FIG. 9, which is configured to detect states of the master application server and the backup application server.

The querying unit is configured to, when the detecting unit detects that the master application server is in failure, if a backup application server state recorded by a management server is a backup ready state, query for a connection state of a hot-backup connection between the master application server and the backup application server.

The master-backup switching unit is configured to, when a backup application server state indicated by the connection state is inconsistent with the backup application server state recorded by the management server, control the master application server and the backup application server to perform switching between the master application server and the backup application server.

As an embodiment, the master-backup switching unit is further configured to, when the detecting unit detects that the master application server is in failure, if the recorded backup application server state is a backup active state, control the master application server and the backup application server to perform the switching between the master application server and the backup application server.

In an embodiment, the apparatus further includes an updating unit. As shown in FIG. 10, the apparatus further includes an updating unit 1014.

The updating unit is similar to the updating unit shown in FIG. 9, and is configured to:

when the detecting unit detects that the master application server is in failure, if a master application server state recorded by the management server is a master active state, update the recorded master application server state to a master failure state; and/or, when the detecting unit detects that the master application server and the backup application server have completed the switching between the master application server and the backup application server, update the recorded master application server state to a master active state, and update the recorded backup application server state to a backup failure state; and/or, when the detecting unit that the backup application server has recovered from a failure, update the recorded backup application server state to the backup ready state, where the backup ready state is used to indicate that the hot-backup connection between a backup application server and a master application server is abnormal when the backup application server is not in failure; and/or, when the detecting unit detects that the backup application server is successfully deployed, record the master application server state as a master active state and the backup application server state as the backup ready state.

In an embodiment, the apparatus further includes a connection controlling unit. As shown in FIG. 10, the apparatus further includes a connection controlling unit 1015.

The connection controlling unit is configured to, when the detecting unit detects that the backup application server is successfully deployed, control the master application server and the backup application server to establish a hot-backup connection, and control the master application server to back up all stored business data to the backup application server through the hot-backup connection after controlling the master application server and the backup application server to successfully establish the hot-backup connection.

As an embodiment, the connection controlling unit further controls the master application server and the backup application server to restore the hot-backup connection when the recorded master application server state is the master active state, the querying unit finds that the backup application server state indicated by the connection state is the backup ready state and the recorded backup application server state is the backup active state.

As an embodiment, the connection controlling unit further controls the master application server and the backup application server to reestablish the hot-backup connection when the detecting unit detects that the backup application server has recovered from a failure. If the reestablishment fails, the number of reestablishment failures is updated. When the updated number of reestablishment failures is less than a set threshold, return to the step of controlling the master application server and the backup application server to reestablish the hot-backup connection, when the updated number of reestablishment failures is equal to the set threshold, the business data currently stored in the backup application server is cleared, the number of reestablishment failures is set as an initial value, and return to the step of controlling the master application server and the backup application server to reestablish the hot-backup connection.

As an embodiment, the updating unit further receives a deletion instruction. When the deletion instruction is used to instruct to delete a master application server, the master application server is deleted, the backup application server is controlled to delete locally recorded configuration information of the master application server, and a device role of the backup application server is controlled to be switched to a master application server w % ben the recorded backup application server state is the backup active state. When the deletion instruction is used to instruct to delete a backup application server, the backup application server is deleted and the master application server is controlled to delete locally recorded configuration information of the backup application server.

As an embodiment, the master-backup switching unit is further configured to, receive an instruction of switching between the master application server and the backup application server; and if a recorded master application server state is a master active state and the recorded backup application server state is a backup active state, control the master application server and the backup application server to perform the switching between the master application server and the backup application server; otherwise, output a switching prohibition message.

So far, the description of the structure diagram of the apparatus shown in FIG. 10 has been completed.

Figure 11:
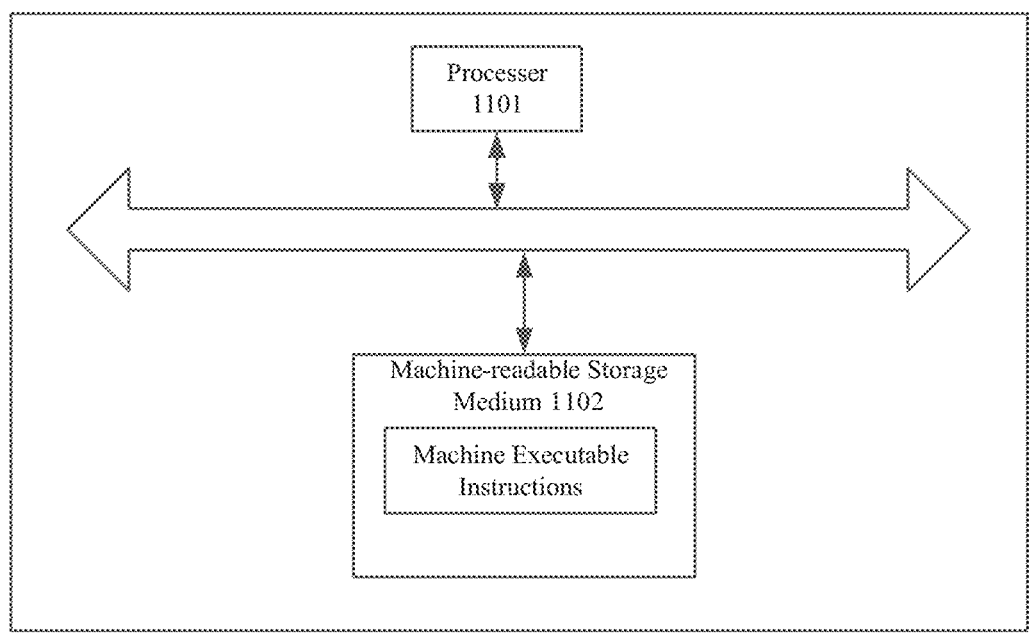
FIG. 11 is a structural diagram illustrating an electronic device according to an embodiment of the present disclosure.

The present disclosure also provides a structural diagram of hardware corresponding to FIG. 9 and FIG. 10. As shown in FIG. 11, the hardware structure may include a processor 1101 and a machine-readable storage medium 1102. The machine-readable storage medium stores machine executable instructions that can be executed by the processor. The processor is configured to execute the machine executable instructions to realize the method disclosed in any of the above examples of the present disclosure.

Based on the same application concept as the above method, the embodiment of the present disclosure further provides a machine-readable storage medium on which several computer instructions are stored. When the computer instructions are executed by a processor, the methods disclosed in the above examples of the present disclosure can be realized.

Based on the same application concept as the above method, the embodiment of the present disclosure further provides a computer program. When the computer program is executed by a processor, the methods disclosed in the above examples of the present disclosure can be realized.

Illustratively, the above machine-readable storage medium may be any electronic, magnetic, optical or other physical storage device, which may contain or store information, such as executable instructions, data. For example, the machine-readable storage medium may be random access memory (RAM), volatile memory, nonvolatile memory, flash memory, storage drive (such as hard disk drive), solid state hard disk, any type of storage disk (such as compact disk, DVD), or similar storage medium, or a combination thereof.

The system, apparatus, modules or units described in the above embodiments can be specifically realized by a computer chip or entity, or by a product with a certain function. A typical implementation device is a computer. The specific form of the computer can be a personal computer, a laptop computer, a cellular phone, a camera phone, a smart phone, a personal digital assistant, a media player, a navigation device, an e-mail transceiver, a game console, a tablet computer, a wearable device or any combination of these devices.

For the convenience of description, the above apparatus is divided into various units according to their functions and described separately. Of course, in implementing the present disclosure, the functions of various units can be realized in one or more software and/or hardware.

Those skilled in the art should understand that the embodiments of the present disclosure may be provided as methods, systems, or computer program products. Therefore, the present disclosure may take the form of a complete hardware embodiment, a complete software embodiment, or an embodiment combining software and hardware. Furthermore, the embodiments of the present disclosure may take the form of a computer program product implemented on one or more computer usable storage media (including but not limited to disk memory. CD-ROM, optical memory, etc.) containing computer usable program codes therein.

The present disclosure is described with reference to the flowchart and/or block diagram of the method, device (system), and computer program product according to the embodiment of the present disclosure. It should be understood that each flow and/or block in flowchart and/or block diagram, and combinations of flows and/or blocks in flowchart and/or block diagram can be implemented by computer program instructions. These computer program instructions may be provided to the processor of a general-purpose computer, a special-purpose computer, an embedded processor or other programmable data processing device to produce a machine, so that means for implementing the functions specified in one or more flows of the flowchart and/or one or more blocks of the block diagram is produced through instructions executed by a processor of a computer or other programmable data processing devices.

Moreover, these computer program instructions can also be stored in a computer-readable memory that can direct the computer or other programmable data processing devices to work in a specific way, so that the instructions stored in the computer-readable memory generate a manufactured product including instruction means that implements the functions specified in one or more flows of the flowchart and/or one or more blocks of the block diagram.

These computer program instructions may also be loaded onto a computer or other programmable data processing devices, so as to are perform a series of operating steps on the computer or other programmable devices to produce computer-implemented processing, so that the instructions are executed on the computer or other programmable devices to provide steps for realizing the functions specified in one or more flows of the flowchart and/or one or more blocks of the block diagram.

The above is only embodiments of the present disclosure and is not intended to limit the present disclosure. For those skilled in the art, the present disclosure may have various changes and variations. Any modification, equivalent replacement, improvement, etc. made within the spirit and principle of the present disclosure shall be included in the scope of the claims of the present disclosure.

The invention claimed is:

1. A state management method, applied to a management server, comprising:
   querying for a connection state of a hot-backup connection between a master application server and a backup application server; and
   when a backup application server state indicated by the connection state is inconsistent with a backup application server state recorded by the management server, updating the recorded backup application server state to the backup application server state indicated by the connection state;
   wherein the backup application server state indicated by the connection state is inconsistent with the recorded backup application server state comprises at least one of:
   when the backup application server state indicated by the connection state is a backup active state, if the recorded backup application server state is a backup ready state, it is determined that the backup application server state indicated by the connection state is inconsistent with the recorded backup application server state; or when the backup application server state indicated by the connection state is a backup ready state, if the recorded backup application server state is a backup active state, it is determined that the backup application server state indicated by the connection state is inconsistent with the recorded backup application server state;

wherein the backup active state is used to indicate that a backup application server works normally, and when the hot-backup connection is normal, the connection state of the hot-backup connection indicates that the backup application server state is the backup active state; the backup ready state is used to indicate that the hot-backup connection between a backup application server and a master application server is abnormal when the backup application server is not in failure, and when the backup application server is not in failure, if the hot-backup connection is abnormal, the connection state of the hot-backup connection indicates the backup application server state is the backup ready state.

2. The state management method according to claim 1, wherein querying for the connection state of the hot-backup connection between the master application server and the backup application server comprises:

sending a query request message to the master application server, wherein the query request message is used to query for the connection state of the hot-backup connection; and obtaining the connection state of the hot-backup connection carried by a received query response message from the query response message.

3. The state management method according to claim 1, further comprising:

when it is detected that the backup application server is in failure, if the recorded backup application server state is the backup active state or the backup ready state, updating the recorded backup application server state to a backup failure state; wherein the backup failure state is used to indicate that a backup application server is in failure.

4. The state management method according to claim 1, further comprising:

when it is detected that the master application server is in failure, if a recorded master application server state is a master active state, updating the recorded master application server state to a master failure state; wherein the master active state is used to indicate that a master application server works normally, and the master failure state is used to indicate that a master application server is in failure.

5. The state management method according to claim 1, further comprising:

when it is detected that the master application server is recovered from a failure, if a recorded master application server state is a master failure state, updating the recorded master application server state to a master active state; wherein the master active state is used to indicate that a master application server works normally, and the master failure state is used to indicate that a master application server is in failure.

6. A method for switching between a master application server and a backup application server, applied to a management server, comprising:

when it is detected that the master application server is in failure, if a backup application server state recorded by the management server is a backup ready state, querying for a connection state of a hot-backup connection between the master application server and the backup application server; wherein the backup ready state is used to indicate that the hot-backup connection between a backup application server and a master application server is abnormal when the backup application server is not in failure; and when a backup application server state indicated by the connection state is inconsistent with the backup application server state recorded by the management server, controlling the master application server and the backup application server to perform switching between the master application server and the backup application server.

7. The method according to claim 6, wherein when it is detected that the master application server is in failure, if the recorded backup application server state is a backup active state, wherein the backup active state is used to indicate that a backup application server works normally, the method further comprises:

controlling the master application server and the backup application server to perform the switching between the master application server and the backup application server.

8. The method according to claim 6, further comprising:

when it is detected that the master application server is in failure, if a master application server state recorded by the management server is a master active state, updating the recorded master application server state to a master failure state; wherein the master active state is used to indicate that a master application server works normally, and the master failure state is used to indicate that a master application server is in failure.

9. The method according to claim 6, further comprising:

when it is detected that the master application server and the backup application server have completed the switching between the master application server and the backup application server, updating a recorded master application server state to a master active state, and updating the recorded backup application server state to a backup failure state; wherein the master active state is used to indicate that a master application server works normally, and the backup failure state is used to indicate that a backup application server is in failure.

10. The method according to claim 6, further comprising:

when it is detected that the backup application server is recovered from a failure, updating the recorded backup application server state to the backup ready state, wherein the backup ready state is used to indicate that the hot-backup connection between a backup application server and a master application server is abnormal when the backup application server is not in failure.

11. The method according to claim 6, further comprising:

when it is detected that the backup application server is successfully deployed, recording a master application server state as a master active state and the backup application server state as the backup ready state; wherein the backup ready state is used to indicate that the hot-backup connection between a backup application server and a master application server is abnormal when the backup application server is not in failure; and controlling the master application server and the backup application server to establish the hot-backup connection.

12. The method according to claim 11, wherein after controlling the master application server and the backup application server to successfully establish the hot-backup connection, the method further comprises:
controlling the master application server to back up all stored business data to the backup application server through the hot-backup connection.

13. The method according to claim 11, wherein if the recorded master application server state is the master active state, wherein the master active state is used to indicate that a master application server works normally, the method further comprises:
when it is found that the backup application server state indicated by the connection state is the backup ready state and the recorded backup application server state is a backup active state, controlling the master application server and the backup application server to restore the hot-backup connection.

14. The method according to claim 10, wherein when it is detected that the backup application server is recovered from a failure, the method further comprises:
controlling the master application server and the backup application server to reestablish the hot-backup connection; and
if reestablishment of the hot-backup connection fails, updating a number of reestablishment failures; and when the updated number of the reestablishment failures is less than a set threshold, returning to the step of controlling the master application server and the backup application server to reestablish the hot-backup connection, when the updated number of the reestablishment failures is equal to the set threshold, clearing business data currently stored in the backup application server and setting the number of the reestablishment failures as an initial value, and returning to the step of controlling the master application server and the backup application server to reestablish the hot-backup connection.

15. The method according to claim 6, further comprising:
receiving a deletion instruction; and
when the deletion instruction is used to instruct to delete a master application server, deleting the master application server, controlling the backup application server to delete locally recorded configuration information of the master application server, and controlling to switch a device role of the backup application server to a master application server when the recorded backup application server state is a backup active state; wherein the backup active state is used to indicate that a backup application server works normally;
when the deletion instruction is used to instruct to delete a backup application server, deleting the backup application server and controlling the master application server to delete locally recorded configuration information of the backup application server.

16. The method according to claim 6, further comprising:
receiving an instruction of switching between the master application server and the backup application server; and
if a recorded master application server state is a master active state and the recorded backup application server state is a backup active state, controlling the master application server and the backup application server to perform the switching between the master application server and the backup application server; otherwise, outputting a switching prohibition message.

17. An electronic device, comprising: a processor and a non-transitory machine-readable storage medium;
wherein the non-transitory machine-readable storage medium stores machine executable instructions that can be executed by the processor; and
the processor is configured to execute the machine executable instructions to perform the steps in the method for switching between the master application server and the backup application server according to claim 6.

18. An electronic device, comprising: a processor and a non-transitory machine-readable storage medium;
wherein the non-transitory machine-readable storage medium stores machine executable instructions that can be executed by the processor; and
the processor is configured to execute the machine executable instructions to perform the following operations:
querying for a connection state of a hot-backup connection between a master application server and a backup application server; and
when a backup application server state indicated by the connection state is inconsistent with a backup application server state recorded by a management server, updating the recorded backup application server state to the backup application server state indicated by the connection state;
wherein the backup application server state indicated by the connection state is inconsistent with the recorded backup application server state comprises at least one of:
when the backup application server state indicated by the connection state is a backup active state, if the recorded backup application server state is a backup ready state, it is determined that the backup application server state indicated by the connection state is inconsistent with the recorded backup application server state; or
when the backup application server state indicated by the connection state is a backup ready state, if the recorded backup application server state is a backup active state, it is determined that the backup application server state indicated by the connection state is inconsistent with the recorded backup application server state;
wherein the backup active state is used to indicate that a backup application server works normally, and when the hot-backup connection is normal, the connection state of the hot-backup connection indicates that the backup application server state is the backup active state; the backup ready state is used to indicate that the hot-backup connection between a backup application server and a master application server is abnormal when the backup application server is not in failure, and when the backup application server is not in failure, if the hot-backup connection is abnormal, the connection state of the hot-backup connection indicates the backup application server state is the backup ready state.

* * * * *